United States Patent
Kalluri et al.

(10) Patent No.: US 8,516,605 B2
(45) Date of Patent: Aug. 20, 2013

(54) ELECTRONIC DEVICE AND SOFTWARE INTERLOCKING SECURITY SYSTEM

(75) Inventors: Seshagiri Prasad Kalluri, Richardson, TX (US); Danny W. Wilson, Garland, TX (US); Adam Christopher Krolnik, Allen, TX (US)

(73) Assignee: Verisilicon Holdings Co., Ltd., Santa Clara, CA (US)

( * ) Notice: Subject to any disclaimer, the term of this patent is extended or adjusted under 35 U.S.C. 154(b) by 996 days.

(21) Appl. No.: 11/835,509

(22) Filed: Aug. 8, 2007

(65) Prior Publication Data
US 2008/0219440 A1    Sep. 11, 2008

Related U.S. Application Data

(60) Provisional application No. 60/893,184, filed on Mar. 6, 2007.

(51) Int. Cl.
*G06F 7/04* (2006.01)

(52) U.S. Cl.
USPC .......................................................... 726/29

(58) Field of Classification Search
None
See application file for complete search history.

(56) References Cited

U.S. PATENT DOCUMENTS

2001/0056539 A1* 12/2001 Pavlin et al. .................. 713/193
2006/0210082 A1*  9/2006 Devadas et al. ............... 380/277

* cited by examiner

*Primary Examiner* — Brandon Hoffman

(57) ABSTRACT

The present invention provides for a security system for an electronic device that, in one embodiment, includes a processor with a software access key encrypted thereon and a software application with a processor access key encoded therein so that operation of the electronic device and execution of the software application requires both the software access key and the processor access key.

20 Claims, 3 Drawing Sheets

ELECTRONIC DEVICE AND SOFTWARE INTERLOCKING SECURITY SYSTEM

CROSS-REFERENCE TO RELATED APPLICATION

This Application claims the benefit of U.S. Provisional Application Ser. No. 60/893,184 filed on Mar. 6, 2007, entitled "Hardware and Software Interlocking Security Device," commonly assigned with the present invention and incorporated herein by reference.

TECHNICAL FIELD OF THE INVENTION

The present invention is directed, in general, to a security system for an electronic device and, more particularly, to a security system utilizing an encrypted code on the electronic device and an encrypted code in the software application operating on the device, wherein the device and software application are each dependent on the other.

BACKGROUND OF THE INVENTION

The manufacturer that designs builds and markets a particular electronic device running a licensed or proprietary software application program does not want the software application to run on a competitor's device or the competitor's device to run the software application. It is desirable in some cases for the electronic device to not be used for any purpose other than running the software application for which it is designed. For example, if a manufacturer is marketing an electronic device designed to run a specific licensed or proprietary game, the manufacturer may not want that game enabled to run on another device. If the manufacturer designs or markets another device, the manufacturer may desire a unique version of the game, with a separate license, to play the game on the new device.

Software developers share similar concerns. If the software developer is paid by a device manufacturer to write a program designed to play a game on the device sold by that manufacturer, the software developer does not want that game enabled to be played on a different electronic device unless adequate compensation is received for such usage.

In many cases an entire marketing program is built around a hardware device and a software application that is sold as a package. Frequently the electronic device manufacturer will turn to a third party to design the software application. The converse may also be true. In each instance, the party selling the device and the party selling the software application expect their particular product to be paired with the other when sold.

Accordingly, what is needed in the art is a security system that does not permit a hardware device to execute unless it is operating a specific software application and, conversely, a software application that can not be executed unless it is loaded on a particular type of hardware device.

SUMMARY OF THE INVENTION

To address the above-discussed deficiencies of the prior art, the present invention provides, in one embodiment, (1) a processor with a software access key encrypted thereon; and (2) a software application with a processor access key encrypted therein, wherein operation of the electronic device operation and execution of the software application requires both the software access key and the processor access key.

In another embodiment the present invention provides for a method of using a security system for an electronic device wherein (1) a software access key is caused to be encrypted on a processor; and (2) a processor access key is caused to be encrypted in a software application, both of which must be present for the electronic device and the software application to function.

The foregoing has outlined preferred and alternative features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
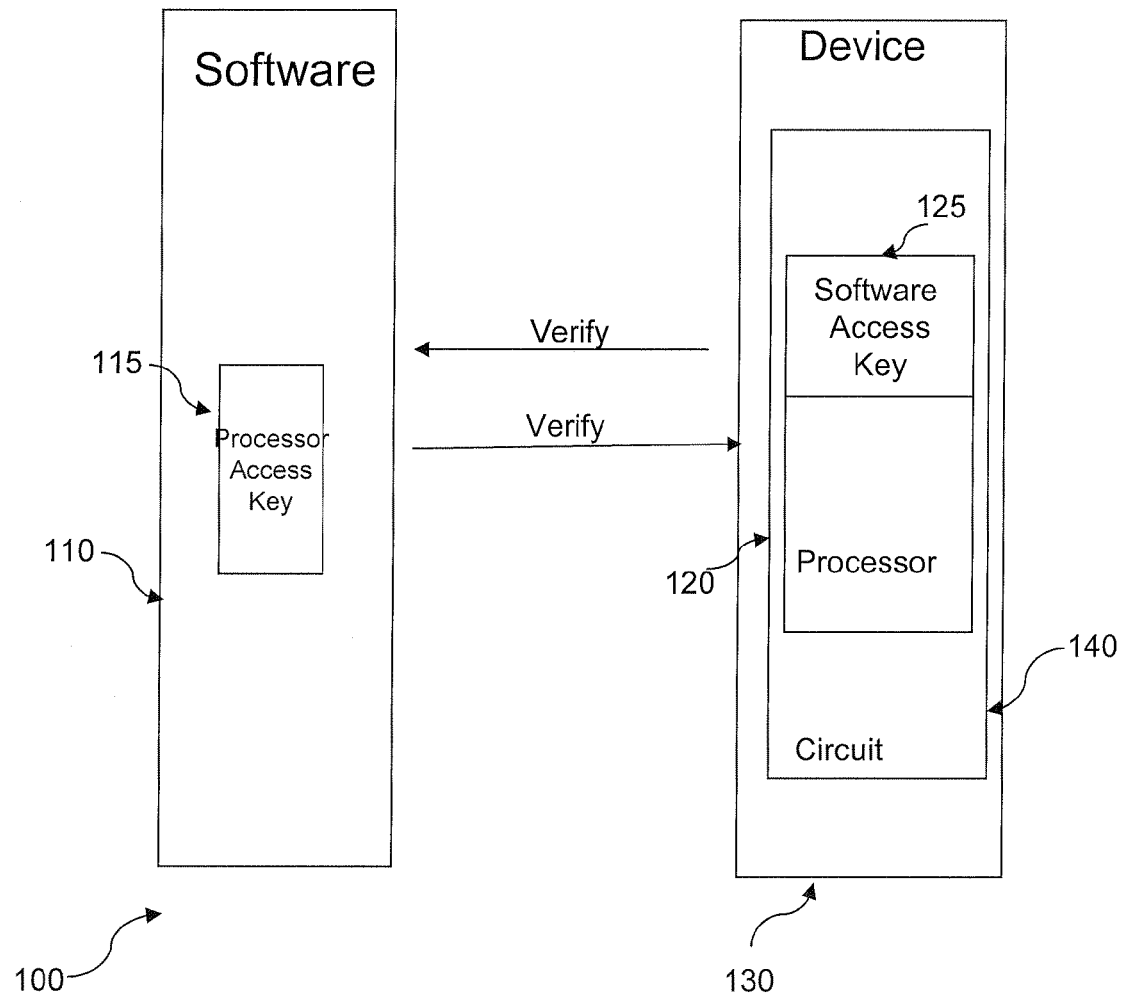
FIG. 1 illustrates a block diagram of an embodiment of a security system, constructed in accordance with the present invention, requiring both a software access key and a processor access key in order for the processor to operate and the software to execute.

Referring initially to FIG. 1, illustrated is a block diagram of an embodiment of a security system 100, constructed in accordance with the present invention, requiring both a software access key 125 and a processor access key 115 for a processor 120 to operate and for a software application 110 to execute. The present invention can be usefully employed on a number of types of electronic device 130. Such devices 130 can, for example, be used for gaming or for downloading and playing music. Those skilled in the pertinent art will readily appreciate that the present invention is not restrictive as to the type of device 130 or as to its function.

The illustrated electronic device 130 has an electronic circuit 140, a component of which is a processor 120 microchip. Encrypted on the processor 120 microchip is a software access key 125. In one embodiment of the invention, the software access key 125 is embedded in the processor 120 microchip. It can, for example, be designed into the silicon structure of the microchip when it is fabricated. While some embodiments of the software access key 125 may not provide for a fixed location, at least one embodiment provides for the software access key 125 to have a fixed memory location on the microchip. In another embodiment, the fixed memory location may be non-relocatable. By fixing the software access key 125 location and making it non-relocatable, the security of the device and its protective encoding is increased because it becomes difficult to remove or modify.

In one embodiment of the invention the software application 110 may be executed by the processor 120 only if the software application 110 has a processor access key 115 encoded therein. In another embodiment, the software application 110 may only be partially executed by the processor 120. For example, the software application 110 may be opened only so far as necessary to take an action such as disabling the electronic device 130 or the processor 120. In one embodiment, software application 110 is required to identify the electronic device 130 by its part number, which requirement constitutes the basis of the device's 130 software access key 125. Other identifying features of the electronic device can also be used.

As discussed above, the security system 100 requires that the electronic device 130 or its processor 120 verify the software application's 110 processor access key 115 before executing the application 110. By the same token, the software application 110 is required to verify the device's 130 software access key 125 before becoming totally responsive to the processor 120. Both the software access key 125 and the processor access key 115 must be present in order for the system 100 to fully operate. To reiterate, the electronic device 130 will not run a software application 110 in its entirety, unless the application 110 has the processor access key 115 and the software application 110 will not be fully operational unless the processor 120 in the device 130 has the software access key 125.

A number of electronic devices are designed to include several functions that traditionally required separate devices. Typical multifunctional devices include, for example, mobile phones, PDAs, and so on. It is not unusual for a cellular telephone, a digital camera and an email function to be included in one device, such as a mobile phone. In addition to a processor designed to execute software functions necessary for the device to perform its principle function or functions, the device may also have a co-processor. As is known to those skilled in the relevant art, the co-processor will be designed to run selected software applications. The present invention is intended to be as equally applicable to a co-processor as it is to a processor.

Figure 2:
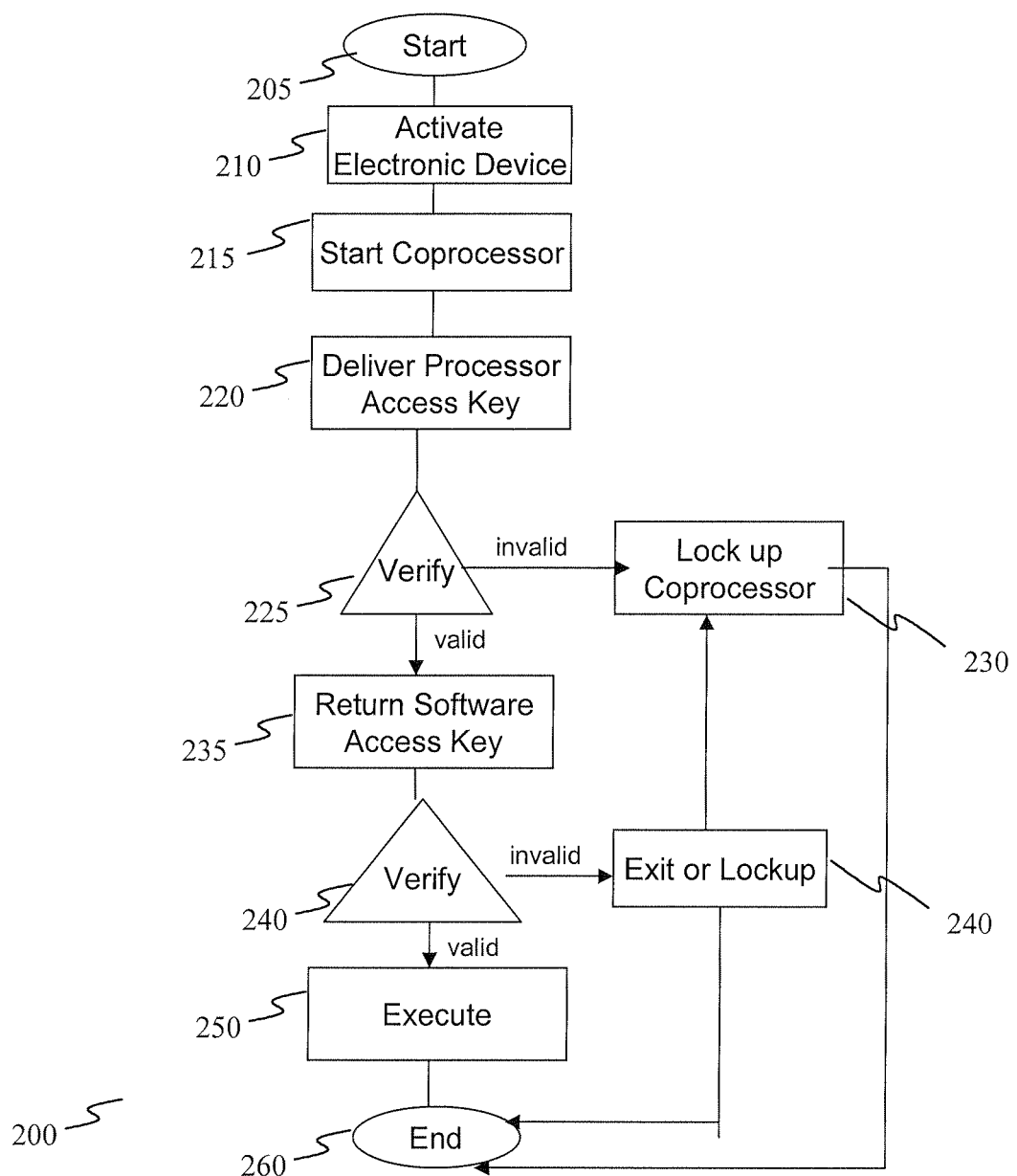
FIG. 2 illustrates a flow chart of the operation of an embodiment of a security system constructed in accordance with the present invention.

Turning now to FIG. 2, illustrated is a flow chart of the operation of an embodiment of a security system 200 constructed in accordance with the present invention. Commencing operation with a start 205 step, the user enters a command to activate the electronic device in an activate electronic device 210 step. In some devices this step turns the electronic device on and starts the process of executing the software application. In other devices, the software application is executed by separate command after the device is turned on. In many devices the software application is executed by a coprocessor. The flow chart in FIG. 2 illustrates a device utilizing a coprocessor.

After the electronic device is turned on in the activate electronic device step, the user issues a command to the software application to start the coprocessor in a start coprocessor 215 step. As part of the start coprocessor 215 step, the software application delivers the processor access key in a deliver software access key 220 step.

Upon receipt of the start coprocessor instructions and the processor access key, the coprocessor verifies the processor access key in a verify processor key 225 query. If the response to the verify processor key 225 query is negative, the coprocessor is locked up in a lockup coprocessor 230 step. The coprocessor can be locked up in a variety of ways, ranging from an absolute shut down to causing the coprocessor to only execute selected portions of the software application. That is, the lockup coprocessor 230 step can be as simple as not executing all or a portion of the software application or as complex as completely deactivating the device. Following the lock up coprocessor 230 step, the operation concludes with an end 260 step.

If the verify processor access key 225 query is positive, the coprocessor, in a return software access key 235 step, returns the software access key to the coprocessor. In a verify software access key 240 query, the software application ascertains whether the coprocessor has the correct software access key. The determination of validity may, for example, be based on the return of a part number or other identification feature furnished by the device in the return software access key 235 step. If the software access key is not valid, such as the part number not being from a device on which the software application should run, the software application will undertake a programmed action in an exit or lockup 240 step to lock the device in a lockup coprocessor 230 step or to cease operations. The action taken can range from the software not responding to certain execution commands so that its operation is limited to that of the issuance of instructions to lockup or deactivate the entire electronic device. Following the exit or lockup 240 step the operation concludes with an end 260 step.

If the software access key is determined to be valid in the verify software access 240 query, the software application may be executed in an execute 250 step and the software becomes functional. The operation concludes with an end 260 step. Optionally, the data can be decrypted during the execute 250 step to increase the security of the application by preventing access to plaintext data required by the executing algorithm. This is done by (1) accepting the encrypted data during the execute 250 step; (2) send the encrypted data to the processor or co-processor for encryption; and (3) retrieve the decrypted data from the processor or co-processor and store and use in the execute 250 step. The procedure can be repeated as necessary.

Figure 3:
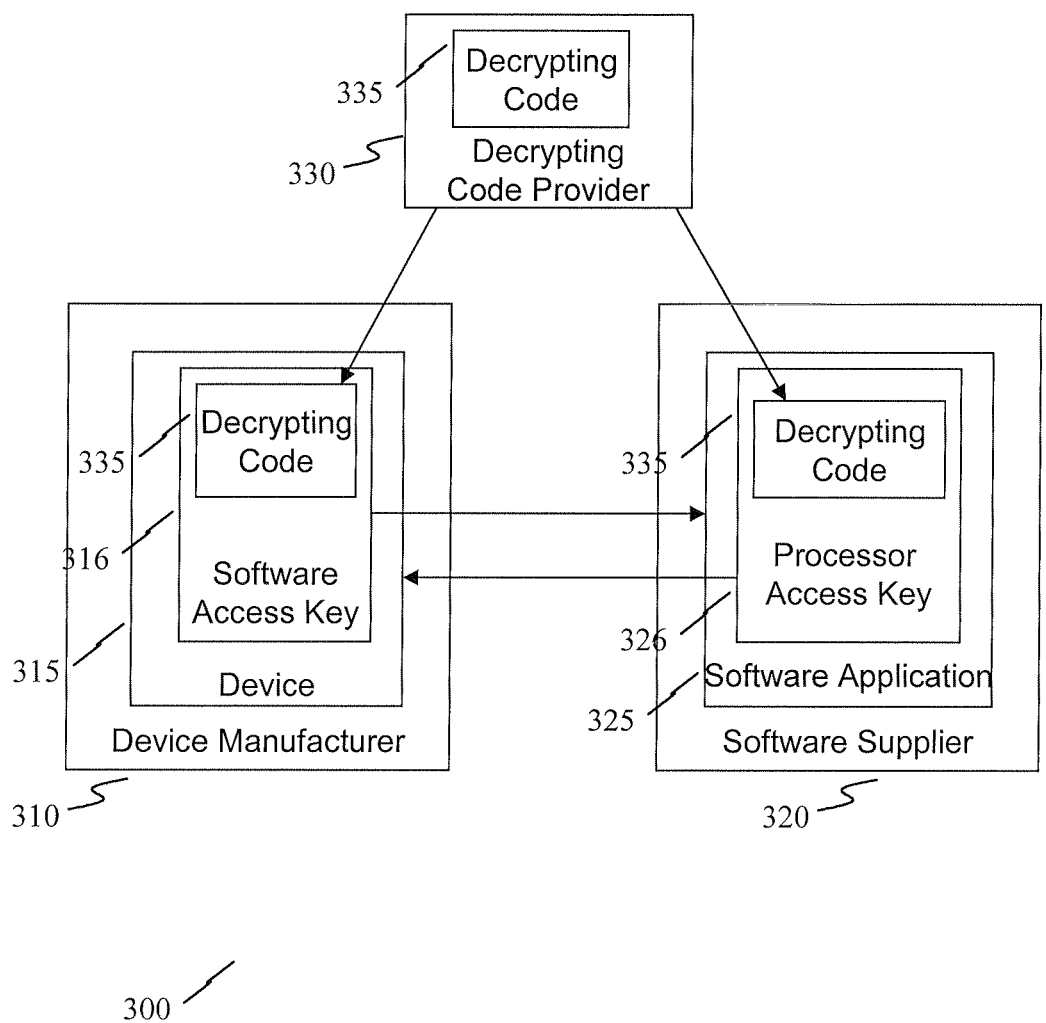
FIG. 3 illustrates a block diagram of a process by which multiple parties can implement an embodiment of the present invention.

Turning now to FIG. 3, illustrated is block diagram of a process 300 by which multiple parties can implement an embodiment of the present invention. In many cases, a device 315 will be manufactured by a device manufacturer 310 and the software application 325 will be supplied by a third party software supplier 320. For competitive reasons, the device manufacturer 310 may not want the device to run software applications other than the one for which it is designed. By the same token, the software supplier 320 may not want its software application 325 to be operated on other devices. In addition, the device manufacturer 310 and the software supplier 320 may want an additional party involved as a further level of protection. FIG. 3 illustrates such a situation.

In the illustrated process 300 assumes a device manufacturer 310 is selling a specialized device 315, such as a handheld electronic game. To get the best game embodiment available, the device manufacturer 310 has made arrangements with a software supplier 320 that specializes in games to provide the appropriate software application 325. Because the device manufacturer 310 is interested in selling devices 315, it does not want potential competitors enabled to manufacture and sell a comparable device that can run the software application 325 embodying its proprietary game. By the same token, the software supplier 320 may want its software application 325 limited to being operated on the specific device 315 for which it was designed for.

The present invention can be usefully employed to achieve the objectives of both the software supplier 320 and the device manufacturer 310. This is done, for example, by the device manufacturer 310 arranging for the processor or coprocessor in the device to be configured to function only if the software application 325 provides the correct processor access key 326. At the same time, the software supplier 320 will encode the software application 325 so that it will not execute, or will perform in a predefined limited manner, if the processor does not provide the correct software access key 316. If both keys are present, the software and processor will function as described above and illustrated in FIGS. 1 and 2.

An additional level of security can be achieved for both the device manufacturer 310 and the software supplier 320 if an additional level of encoding is added to the process. An additional level of encoding can be added, for example, by using a decrypting code 335 provided by a third party decrypting code provider 330. This decrypting code 335 can be made necessary for the software application 325 to decrypt the software access key 316 and for the device 315 to decrypt the processor access key 326. When an unrelated third party is the decrypting code provider 330, an additional security layer is provided to both the device manufacturer 310 and the software provider 320. The decrypting code 335 can be a required element to decode both the software access key 316 and the processor access key 326 or, in some embodiments, it may only be required to decode one of the two keys.

Although the present invention has been described in detail, those skilled in the pertinent art should understand that they can make various changes, substitutions and alterations herein without departing from the spirit and scope of the invention in its broadest form.

What is claimed is:

1. A security system for an electronic device, comprising:
a processor with a software access key stored thereon; and
a software application executable on said processor and having a processor access key stored therein, wherein said processor access key is different from said software access key, and full operation of said electronic device and full execution of said software application requires both said software access key and said processor access key.

2. The security system as recited in claim 1 wherein said software access key is structurally embedded during fabrication in a processor microchip.

3. The security system as recited in claim 2 wherein said software access key has a fixed location.

4. The security system as recited in claim 1 wherein operation of said electronic device is limited if said processor access key is not present.

5. The security system as recited in claim 1 wherein said electronic device is rendered inoperable if said software access key is not present.

6. The security system as recited in claim 1 wherein said processor access key includes a part number.

7. The security system as recited in claim 6 wherein said part number is required before said processor executes said software application.

8. The security system as recited in claim 1 further comprising a decrypting code for decrypting said software access key and said processor access key.

9. The security system as recited in claim 1 wherein said processor is a co-processor.

10. The security system as recited in claim 1 wherein said software access key and said processor access key are encrypted.

11. A method of using a security system for an electronic device, comprising:
storing a software access key on a processor;
storing a processor access key in a software application executable on said processor, said processor access key being different from said software access key; and
requiring both said software access key and said processor access key for said electronic device to fully function and said software application to fully execute.

12. The method as recited in claim 11 wherein said software access key is structurally embedded during fabrication in a processor microchip.

13. The method as recited in claim 12 wherein said software access key has a fixed location.

14. The method as recited in claim 11 wherein operation of said electronic device is limited if said processor access key is not present.

15. The method as recited in claim 11 wherein said electronic device is rendered inoperable if said software access key is not present.

16. The method as recited in claim 11 wherein said processor access key includes a part number.

17. The method as recited in claim 11 further comprising a decrypting code for decrypting said software access key and said processor access key.

18. The method as recited in claim 11 wherein said processor is a co-processor.

19. The method as recited in claim 11 wherein said software access key and said processor access key are encrypted.

20. A security system for an electronic device, comprising:
a processor having a software access key structurally embedded during fabrication thereon, said processor being configured to provide said software access key to a software application running on said processor; and
a processor access key within said software application being different from said software access key, said processor being further configured to acquire said processor access key from said software application and to execute said software application only if both of said software access key and said processor access key are determined to be valid.

* * * * *